Jan. 17, 1939.     O. L. LEWIS     2,143,921
GEARED DRIVE
Filed July 11, 1935     2 Sheets-Sheet 1
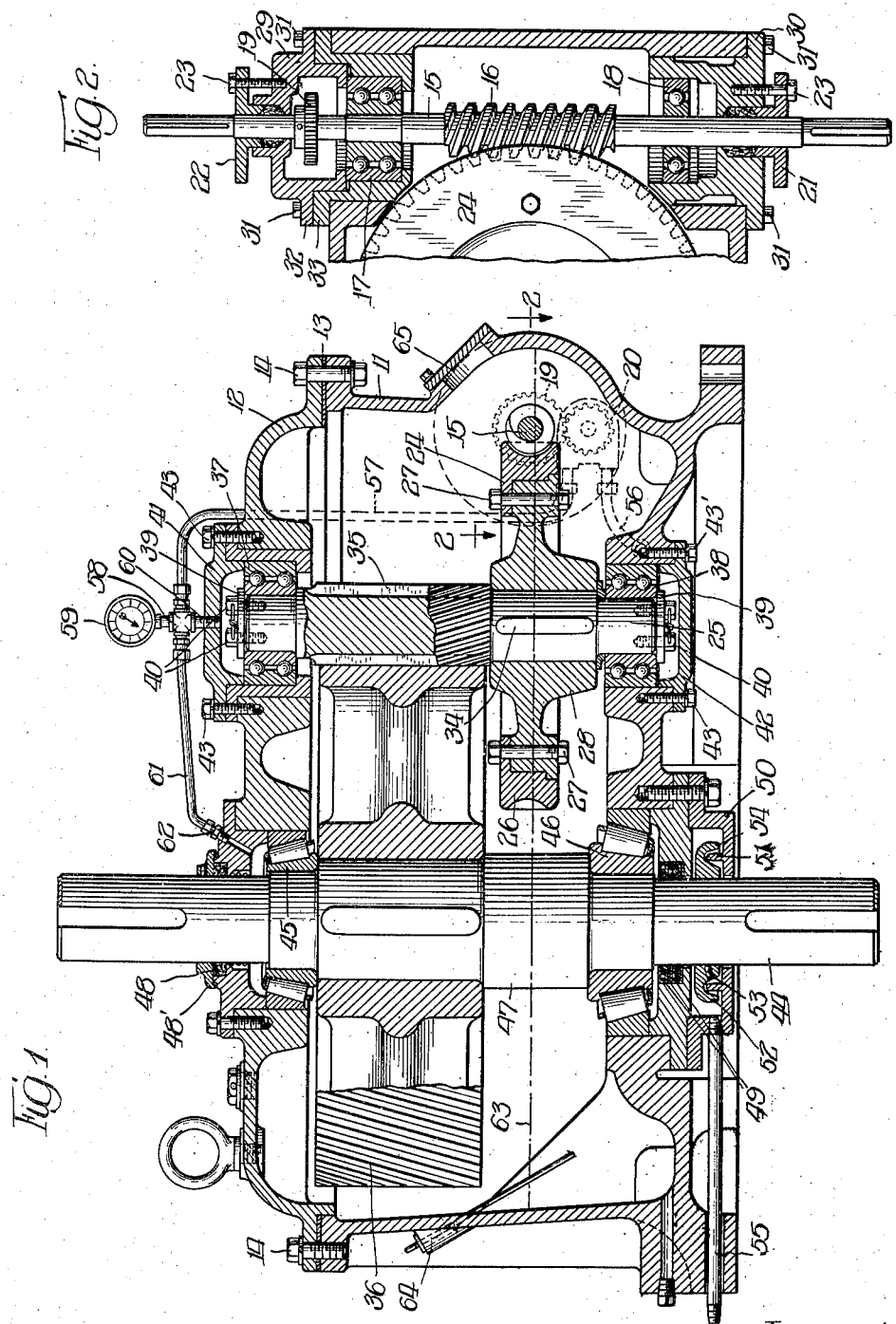
Inventor;
Otto L. Lewis,
By Cromwell, Greist + Warden
attys Jan. 17, 1939.  O. L. LEWIS  2,143,921
GEARED DRIVE
Filed July 11, 1935  2 Sheets-Sheet 2

Inventor:
Otto L. Lewis,
By Cromwell, Greist & Warden
Attys.

Patented Jan. 17, 1939

2,143,921

UNITED STATES PATENT OFFICE 2,143,921

GEARED DRIVE

Otto L. Lewis, Chicago, Ill., assignor, by mesne assignments, to Foote Bros. Gear and Machine Corporation, Chicago, Ill., a corporation of Delaware Application July 11, 1935, Serial No. 30,773

3 Claims. (Cl. 74—427)

The present invention relates to geared drives and more particularly to geared drives for use in the driving of agitators for mash tubs, dye tubs and the like.

In the driving of such equipment it is desirable to have substantial reductions in speed, to carry fairly heavy loads, and to be able to operate the agitators from either a high speed or a low speed motor for the reason that many processes in agitating require various speeds of operation. It is also desirable that the agitator be manually movable in a direction reverse to its normally driven direction in order that the tub in which the agitator is mounted may be more conveniently cleaned. The driving mechanism may be mounted either at the top of tub or at the bottom thereof. When mounted at the top, it is beneficial to prohibit oil leakage from the drive so that there is no possibility of contaminating the contents of the tub.

One object of this invention is to provide a geared drive that is compact and simple in construction.

Another object of this invention is to provide a geared drive that is efficient in operation and that may be easily cleaned and repaired.

A further object of this invention is to provide a novel and efficient lubricating system for a geared drive.

A still further object of this invention is to provide a lubricated geared drive that may be used with equipment containing food products without contaminating the same with oil and grease.

Another object is to provide means for driving a geared drive at various speeds for operation with various equipment and processes.

Still further objects will be pointed out hereinafter or will be readily apparent to one skilled in the art upon a reading of the following description and by reference to the drawings appended hereto wherein Fig. 1 is a view in cross section showing the driving gears with a housing and lubricating arrangement;

Fig. 2 is a section on the line 2—2 of Fig. 1;

Figure 4:
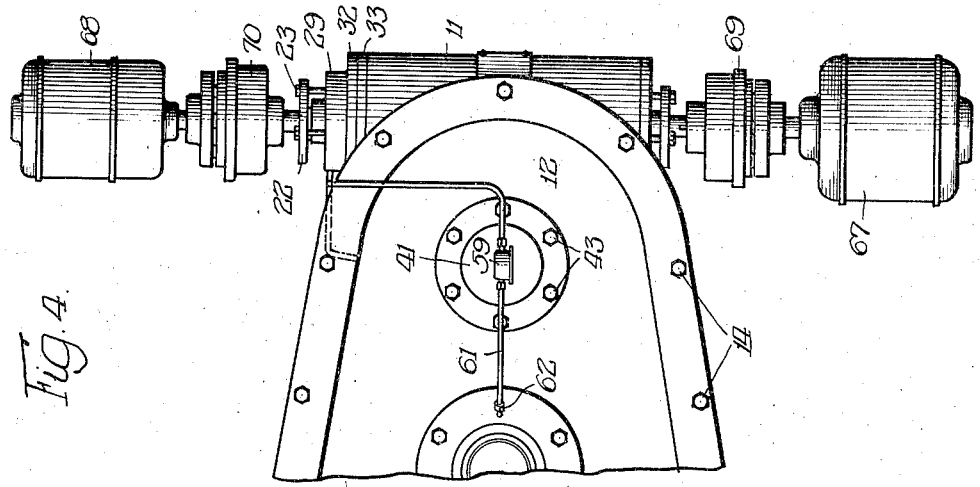
Fig. 4 is a top plan view showing the drive arranged with two motors.

In the drawings it will be observed from Fig. 1 that a housing having a bottom portion 11 and a top portion 12 is provided to receive and close the gearing. A gasket 13 is placed between the top and bottom portions of the housing and the housing portions are held together by means of bolts 14. A high speed drive shaft 15 is provided at one end of the housing and mounted thereon is a worm gear 16. As appears in Fig. 2 the shaft extends transversely of the housing and is journaled by means of the bearings 17 and 18. These bearings are preferably of the anti-friction type and act both as thrust bearings as well as bearings for the journal. There is also mounted on the shaft 15 a gear 19 which drives an oil pump 20. Both ends of the shaft 15 may extend beyond the housing for the use of two driving motors 67 and 68 adapted to operate at different speeds relative to each other. Packing glands 21 and 22 are provided on both ends of the shaft 15, said glands having associated therewith bolt members 23 which may be screwed down to make a firm oil-tight seal, as is clearly shown in Fig. 2.

The worm gear 16 drives a gear 24 which is mounted on a shaft 25. The gear 24 is preferably made with a separate annulus or face 26 that is attached by means of the bolts 27 to the hub portion 28. This arrangement is advantageous for the reason that should there be wear on the teeth of the gear the annulus may be conveniently removed and a new annulus substituted or should it be desirable to change the ratio of the drive, this may be easily done by the substitution of a different worm gear and different annulus for the annulus 26 since the bearings and the mounting for the worm gear shaft 15 are readily removable from the housing.

Ease of removability of the worm gear shaft is accomplished in this embodiment by providing end caps 29 and 30, as shown in Fig. 2, which are bolted by means of bolts 31 to the housing, the end cap 30 carrying the bearing 18 and the sleeve 21. The end cap 29 is provided in two sections, indicated by the reference numerals 32 and 33. This construction is preferable as the section 32 includes the gear 19 and the pump 20 and the section 33 carries the bearing 17. It is a simple matter to remove the worm gear as it is merely necessary to remove the end cap 29 and perform the substitution of a new or different worm gear. The end cap 30 may also be removed for the purpose of replacing the bearings or for ease in assembly.

Referring back to Fig. 1, it will be observed that the gear hub 28 is shown keyed to the shaft 25, as indicated by the reference numeral 34. Mounted adjacent the hub member 28 on the shaft 25 is a helical pinion 35 which drives a helical gear 36. The shaft 25 is mounted in the housing by means of bearings 37 and 38 respectively, the bearing 37 being in the housing portion 12 and the bearing 38 being in the housing portion 11. The bearings may be of the usual anti-friction type, and, to take care of thrust members 39, may be fixed to each end of the shaft 25 by means of bolts 40. The members 39 bear against the outer face of the bearings 37. In order to facilitate bearing inspection, replacement or adjustment, and also to permit ease in assembly or disassembly caps 41 and 42 are provided at each end of the shaft 25, the caps being held in place by bolts 43.

The pinion 35 drives the gear 36 which is mounted on the slow speed shaft 44 and is keyed thereto in the usual manner. The slow speed shaft 44 is provided with bearings 45 and 46 at each end thereof. These bearings are preferably of the tapered roller bearing type so that they are capable of withstanding heavy loads and of absorbing a substantial end thrust. This is normally of importance in a machine of this type as very often the slow speed shaft must carry the entire load of agitator equipment or other driven device. Between the hub of the gear 36 and the bearing 46 the shaft is shown as enlarged at 47 so as to provide a seat for the gear 36 and also a backing member for the inner face of the bearing 46.

It is to be observed that the pinion 35 is cut with helical teeth and the end thrust of the pinion 35 is opposed to the end thrust from the gear 24 and, since they are both mounted on the same shaft, they tend to equalize each other and thus reduce to a minimum the end thrust of the shaft 25 and consequently reduce the wear on the bearings and gears to a minimum.

The upper end of the slow speed shaft is provided with the usual oil seals and felt oil retainer, indicated at 48, and an umbrella member 48' for shedding water. The member 48' is grooved to fit over a projecting portion of the housing so that when the unit is washed down with a hose, a water-tight seal is provided to prohibit water from entering the gear case. When these units are used to drive a mash tub, it is common practice to clean up the equipment by washing it down with a stream of water under pressure.

The bottom portion of the housing surrounding the slow speed shaft is provided with a pair of oil retainers 49 which are preferably of the flanged leather type. A cap and drain member forming a chamber 50 is provided beneath the oil retainers, the chamber 50 being provided with a circular baffle or pitch 51 which extends upwardly from the bottom of the member 50 and around the slow speed shaft. An annular shield member 52, which is an oil tight fit on shaft 44 and is affixed to the slow speed shaft 44 by means of a set screw 53, extends around the slow speed shaft and is provided with a grooved or recessed portion that receives the annular baffle member 51. This shield has an overhung skirt portion or lip 54 that extends into the chamber over the baffle 51 below and beyond the top thereof. A drain pipe 55 extends out from the member 50, the purpose of this pipe being to drain off any oil which may collect in the trap 50. This assembly of the lower bearing of the slow speed shaft, oil retainers, and oil trap insures against the possibility of oil or grease passing down the slow speed shaft into the agitator or other driven equipment. Any small amount of oil which may pass the oil retaining members 49 is deposited on the member 52 and runs out over the face of that member and drips off the overhung edge 54 thereof into the oil trap or receptacle 50 where it is drained off by the pipe 55. The circular baffle 51 prohibits the oil from running inwardly toward the slow speed shaft from the chamber 50.

Lubrication of the gearing may be accomplished not only through the splash system but also by forced feed. As shown the oil pump 20 picks up oil from the lower portion of the casing through the pipe 56, forces it up through the pipe 57 and thence to the fitting 58 which contains a pressure gauge 59 and an outlet 60 into the bearing 37. In the fitting 58 oil is also fed through the pipe 61 to a suitable fitting 62 and feeds oil to the bearing 45. The oil forced to the bearing 37 passes down through the bearing and on to the pinion 35, thus lubricating the pinion and also supplying oil to the driven gear 36. The oil from the fitting 62 lubricates the bearing 45. The oil level in the housing should be maintained at the point indicated by the line 63 which passes through the gear 26 and the worm gear 19 so that, as these gears rotate, oil is splashed over the working parts.

The construction herein described permits the mounting of the helical gears 35 and 36 above the oil level line and consequently they do not run in oil. This is a feature of importance since helical gears tend to heat up when immersed in oil.

The bearings 38 and 46 are immersed in oil.

An oil level gauge of the usual design is provided at 64 so that the amount of oil present in the casing can readily be determined.

An opening is provided at the point 65 immediately adjacent the worm gear in the housing so as to permit inspection of this gear.

Figure 3:
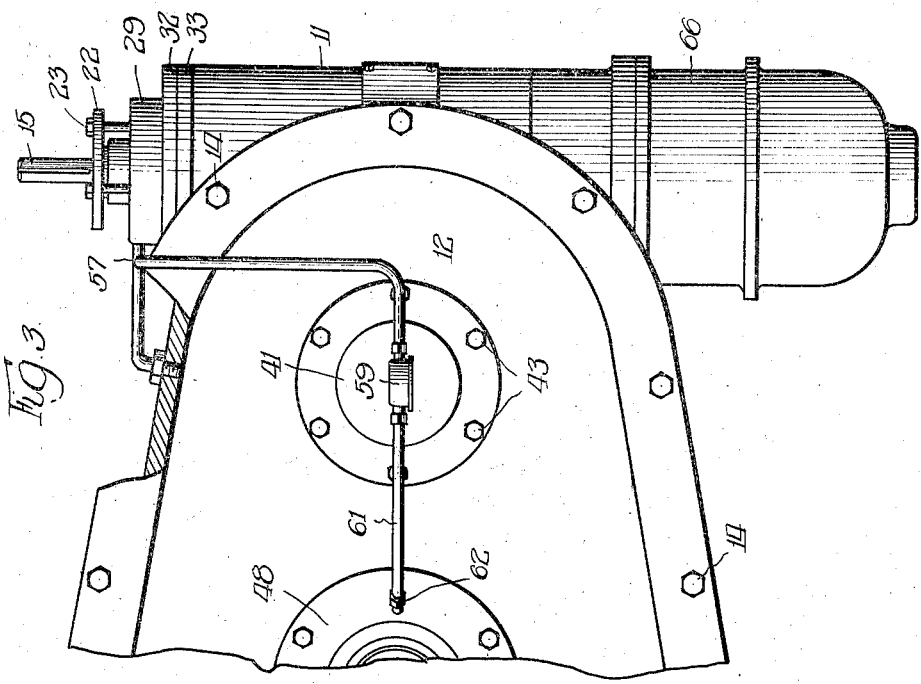
Fig. 3 is a top plan view showing a driving motor directly mounted on the gear casing.

As shown in Fig. 3, the gearing may be driven by a single motor 66 which may be directly attached to the housing 11 or, as shown in Fig. 4, the gear may be provided with two motors, for instance, a high speed motor 67 and a low speed motor 68, each of these motors driving through overrunning clutches 69 and 70, respectively. In some installations it may be desirable from the standpoint of economy to omit the overrunning clutch 69. The use of two motors is desirable in many installations for the reason that it is frequently advisable to drive the equipment at various speeds. The arrangement of the driving shaft, so that a motor may be attached to either end thereof, permits the application of two motors without any change in the arrangement or design of the equipment. Likewise, the gearing is so arranged and constructed that the power take-off may be either above or below the gear as in some installations it is desirable to place the drive below the equipment being operated and in other instances above.

A high helical angle on the worm gear is preferred so that the equipment may be manually driven backwards by movement of the slow speed shaft from movement of an agitator or other driven mechanism operatively connected thereto. The range of helical angularity which is practical for such operation is 18° to 45°. As pointed out in the beginning of this specification, this is an aid in cleaning the driven equipment as it is generally desirable to move the mechanism in a reverse direction for this purpose.

The upper half of the housing may be readily removed for the purpose of replacing worn gearing. The arrangement of the bearings, and their mounting, is such that a bearing may be removed for replacement or adjustment with ease since it is merely necessary to remove the end cap of the bearing giving trouble and the bearing itself may be readily removed for inspection and replacement.

One embodiment of the present invention has been shown in the appended drawings for the purpose of exemplification and the description herein has been in reference thereto. It will be understood that this invention is capable of structural modification in various forms coming equally within the scope of the appended claims. The present description and drawings are therefore not to be construed as necessarily limiting the scope of these claims which are intended to define the various structural modifications in which the present invention may be formed.

I claim:

1. In a geared drive, the combination of a housing, a worm mounted in said housing, a worm gear driven by said worm, a helical pinion mounted on the same shaft as said worm gear and in such relation to said gear that the end thrust from said pinion is opposed to the end thrust from said gear, a power output shaft and a gear on said shaft and driven by said pinion.

2. In a vertical drive for agitators and the like a housing, a high speed shaft horizontally mounted in said housing and having a worm carried thereon, the ends of said high speed shaft extending beyond said housing for connection with driving motors operable at different speeds relative to each other, an overrunning clutch operably connected between one of said motors and said worm for cutting out one motor while the other is running, a driven shaft vertically mounted in said housing, a worm gear mounted on the lower end of said driven shaft and operably connected to said worm, a helical pinion mounted on the upper end of said shaft operable upon movement of said worm gear, a low speed driven shaft vertically mounted in said housing adjacent said driven shaft, the ends of said low speed driven shaft extending beyond said housing for connection with driven mechanism at either end, a helical gear mounted on said low speed shaft and operably connected to said helical pinion, said worm gear and worm having a relatively high helical angle whereby they may be reversed by manual operation of said driven mechanism.

3. The structure set forth in claim 2 wherein said worm gear and helical pinion are so mounted on the driven shaft that the end thrust from said pinion is opposed to the end thrust from said gear.

OTTO L. LEWIS.